(12) United States Patent
Rosenberg et al.

(10) Patent No.: US 8,697,823 B2
(45) Date of Patent: Apr. 15, 2014

(54) CATALYSIS OF CROSS-LINKING

(75) Inventors: Jan-Erik Rosenberg, Falkenberg (SE); Erik Lager, Lund (SE); Daniel Röme, Lund (SE); David Persson, Malmö (SE)

(73) Assignee: Nexam Chemical AB, Lund (SE)

( * ) Notice: Subject to any disclaimer, the term of this patent is extended or adjusted under 35 U.S.C. 154(b) by 0 days.

(21) Appl. No.: 13/697,583

(22) PCT Filed: May 16, 2011

(86) PCT No.: PCT/EP2011/057864
§ 371 (c)(1),
(2), (4) Date: Dec. 12, 2012

(87) PCT Pub. No.: WO2011/141578
PCT Pub. Date: Nov. 17, 2011

(65) Prior Publication Data
US 2013/0079479 A1   Mar. 28, 2013

(30) Foreign Application Priority Data

May 14, 2010 (SE) .................................. 1050475
Jun. 18, 2010 (SE) .................................. 1050631

(51) Int. Cl.
*C08F 2/00* (2006.01)
*C08F 4/00* (2006.01)

(52) U.S. Cl.
USPC ............................ 526/193; 526/204; 526/217

(58) Field of Classification Search
USPC ....................................... 526/193, 204, 217
See application file for complete search history.

(56) References Cited

U.S. PATENT DOCUMENTS

| 5,567,800 | A | 10/1996 | Hergenrother et al. |
| 6,344,523 | B1 * | 2/2002 | Hawthorne et al. ........ 525/328.1 |
| 2003/0064235 | A1 | 4/2003 | Okawa et al. |
| 2004/0147710 | A1 | 7/2004 | Yokotsuka et al. |

FOREIGN PATENT DOCUMENTS

| EP | 0 761 759 A2 | 3/1997 |
| EP | 1 669 389 A1 | 6/2006 |
| EP | 1 995 635 A1 | 11/2008 |
| EP | 2 025 698 A1 | 2/2009 |
| EP | 2 113 810 A1 | 11/2009 |

OTHER PUBLICATIONS

International Search Report for corresponding International Application No. PCT/EP2011/057864 mailed Aug. 19, 2011.
Hergenrother, "Acetylene-Terminated Imide Oligomers and Polymers Therefrom", Polymer Preprints, American Chemical Society, vol. 21 (1), 1980, pp. 81-83 (cited in specification on p. 2).
Connell et al., "Oligomers and Polymers Containing Phenylethynyl Groups", Journal of Macromolecular Science, Part C: Polymer Reviews, 2000, vol. 40 (2 & 3), pp. 207-230 (cited in specification on p. 3).

\* cited by examiner

*Primary Examiner* — William Cheung
(74) *Attorney, Agent, or Firm* — Renner, Otto, Boisselle & Sklar, LLP

(57) ABSTRACT

Disclosed is use of catalysts for chain extension and/or cross-linking of oligomers or polymers comprising carbon-carbon triple bonds.

19 Claims, No Drawings

CATALYSIS OF CROSS-LINKING

This application is a national phase of International Application No. PCT/EP2011/057864 filed May 16, 2011 and published in the English language, which claims priority to Application No. SE 1050475-1 filed May 14, 2010 and Application No. SE 1050631-9 filed Jun. 18, 2010.

FIELD OF THE INVENTION

The present invention relates to use of catalysts for chain extension and/or cross-linking of oligomers or polymers comprising carbon-carbon triple bonds (acetylenic polymers). Further it relates to a method for such chain extension and/or cross-linking. The invention also relates to catalytic compositions to be used for cross-linking reactions.

BACKGROUND

Polymers have for long been used as replacement material for other materials, such as metals. They have the advantage of being light-weight materiel, which are relative easy to shape. However, polymers do typically have lower mechanical strength compared to metals. Further, they are less heat resistant.

The need for resistant polymers led to the development of aromatic polyimides. Polyimides are polymers comprising imide bonds. Aromatic polyimides are typically synthesized by condensation of aromatic carboxylic acid dianhydride monomers, such as pyromellitic dianhydride, 4,4'-oxydiphthalic anhydride, 2,2-bis-[4-(3,4-dicarboxyphenoxy)phenyl]-propane dianhydride, 3,3',4,4'-benzophenonetetracarboxylic acid dianhydride or 3,3',4,4'-tetracarboxybiphenyl dianhydride, with aromatic diamine monomers, such as 4,4'-oxydianiline, 1,4-diaminobenzene, 1,3-diaminobenzene, 1,3-bis-(4-aminophenoxy)benzene, 1,3-bis-(3-aminophenoxy)benzene, methylenedianiline or 3,4'-oxydianiline.

Polyimides obtained via condensation of pyromellitic dianhydride and 4,4'-oxydianiline are among others sold under the trademarks Vespel® and Meldin®. They are materials which are lightweight and flexible, and which have good resistant to heat and chemicals.

Further, thermoset polyimides have inherent good properties, such as wear and friction properties, good electrical properties, radiation resistance, good cryogenic temperature stability and good flame retardant properties. Therefore, they are used in the electronics industry for flexible cables, as an insulating film on magnet wire and for medical tubing. Polyimide materials are also used in high or low temperature exposed applications as structural parts were the good temperature properties is a prerequisite for the function.

The need to improve the processability, while keeping the mechanical properties, of polyimides for use in airplanes and aerospace applications led to the introduction of cross-linking technologies. As the polymer chains are cross-linked, they may be shorter whilst the mechanical properties are maintained or even improved. Shorter polymer chains have the advantage of being easier to process, as the viscosity of the polymer melt or solution of the polymer is lower.

Examples of such cross-linking technologies include the bismaleimides and the nadimide-based PMR resins, which undergo cure at temperatures near 250° C. However, such thermoset polyimides will not withstand oxidative degradation on long-term exposure at temperatures above 200° C., as the cross-linking moieties have inferior thermal stability, compared to the oligoimide units.

In attempts to improve the thermal stability, thermoset polyimides containing phenylethynyl-substituted aromatic species as the reactive moieties have been developed.

U.S. Pat. No. 5,567,800 discloses phenylethynyl terminated imide oligomers (PETIs). Such oligomers may be prepared by first preparing amino terminated amic acid oligomers from dianhydride(s) and an excess of diamine(s) and subsequently end-cap the resulting amino terminated amic acid oligomers with phenylethynyl phtalic anhydride (PEPA). The amic acid oligomers are subsequently dehydrated to the corresponding imide oligomers.

Upon heating the triple bonds will react and cross-link the end-capped polyimid, thereby further improving its heat resistance and mechanical strength. As disclosed by U.S. Pat. No. 5,567,800 heating to at least 350° C. is necessary to cure the PETI.

However, for some applications the high curing temperature may be considered a problem. For instance, the properties (such as the coefficient of thermal expansion) of flexible polyimide films, having a melting temperature below 350° C., may be improved via cross-linking. However, the high temperature (above 350° C.) needed to initiate cross-linking will make the processing impossible.

If the curing temperature may be lowered, a film may be formed from a solution. During the drying step, curing may then be initiated by heating the film without melting it.

As an alternative to PEPA, also ethynyl phtalic anhydride (EPA) has been used as cross-linker in polyimides (Hergenrother, P. M., "Acetylene-terminated Imide Oligomers and Polymers Therefrom", Polymer Preprints, Am. Chem. Soc., Vol. 21 (1), p. 81-83, 1980). Although polyimides comprising EPA may be cross-linked at a somewhat lower temperature, i.e. at about 250° C., it suffers from other drawbacks. The exchange of the phenyl ethynyl group to an ethynyl group implies that other reaction pathways than the desired curing mechanism, such as chain extension, are favored. As a consequence, EPA has not found any wide use as a replacement to PEPA as a low temperature curing end-capper. Further, the manufacture of EPA requires protective group chemistry hampering its commercial potential.

U.S. Pat. No. 6,344,523 addresses the disadvantageous of the high curing temperature discussed above and discloses that use of sulfur or organic sulfur derivatives as curing promoters may lower the curing temperature of PETI. However, the introduction of such promotors suffers from other disadvantages. In particular the curing results in chain extension rather than cross-linking as two ethynyl groups react along with one sulfur radical ultimately forming a thiophene structure.

After introducing phenylethynyl based cross-linking concept for polyimides, it has also been employed in other polymers than polyimides, such as poly(arylene ether)s (cf. J. W. Connell et al *Oligomers and Polymers Containing Phenylethynyl Groups*", Polymer Reviews, Vol. 40(2 & 3), 2000, pp. 207-230). Similar to acetylenic polyimides, also other acetylenic polymers suffers from the need to employ high temperature in order to initiate cross-linking.

In EP 2 025 698, EP 1 995 635, EP 1 669 389 and US 2004/0147710, all relating to cross-linkable aromatic fluorinated pre-polymers, it is stated that amines such as aniline, i.e. a nuclephilic primary, i.e. non-tertiary, amine, triethylamine, aminophenyltrialkoxysilane and aminopropyltrialkoxysilane and organic metal compound containing molybdenum, nickel or the like, may be used as catalysts for pre-polymer containing ethynyl groups as the cross-linkable functional groups. However, said effect is not supported by experimental data.

3

Thus, there is need within the art for ways of lowering the temperature at which cross-linking of acetylenic oligomers or polymers are initiated.

SUMMARY

Consequently, the present invention seeks to mitigate, alleviate, eliminate or circumvent one or more of the above-identified deficiencies in the art and disadvantages singly or in any combination by using a cyclic aliphatic tertiary amine, a heteroaryl comprising at least one nitrogen atom within the aromatic ring, which nitrogen atom has one electron pair being part of the delocalized aromatic electrons and one electron pair not being part of the delocalized aromatic electrons, or a tertiary nucleophilic organophosphorus compound, as catalyst for chain extension and/or cross-linking of an oligomer or a polymer comprising a carbon-carbon triple bond. By use of such catalyst the temperature at which chain extension and/or cross-linking is initiated may be lowered.

A further aspect relates to a composition comprising a cyclic aliphatic tertiary amine, a heteroaryl, or a tertiary nucleophilic organophosphorus compound, optionally a co-catalyst, the co-catalyst being a compound according to formula (I) or (II),

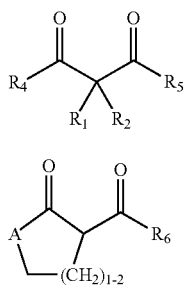

wherein
R1 and R2, independently of each other, are hydrogen or C1-4 alkyl;
R4 and R5, independently of each other, are C1-5 alkyl or OC1-5 alkyl;
A is O, NC1-5 alkyl, or CH2; and
R6 is C1-5 alkyl or OC1-5 alkyl;
an oligomer or a polymer comprising a carbon-carbon triple bond, and optionally a solvent.

Another aspect relates to a method of chain extending and/or cross-linking an oligomer or a polymer comprising a carbon-carbon triple bond, comprising the steps of:
providing a composition as disclosed above; and
heating the composition to initiate chain extension and/or cross-linking to obtain a chain extended and/or cross-linked polymer.

Further advantageous features of the invention are defined in the dependent claims. In addition, advantageous features of the invention are elaborated in embodiments disclosed herein.

DETAILED SUMMARY OF PREFERRED EMBODIMENTS

Definitions

In the context of the present application and invention, the following definitions apply:

4

As used herein, "halo" or "halogen" refers to fluoro, chloro, bromo, and iodo.

As used herein, "alkyl" used alone or as a suffix or prefix, is intended to include both branched and straight chain saturated aliphatic hydrocarbon groups having from 1 to 12 carbon atoms or if a specified number of carbon atoms is provided then that specific number is intended. For example "C1-6 alkyl" denotes alkyl having 1, 2, 3, 4, 5 or 6 carbon atoms. When the specific number denoting the alkyl-group is the integer 0 (zero), a hydrogen-atom is intended as the substituent at the position of the alkyl-group. For example, "N(C0 alkyl)$_2$" is equivalent to "NH2" (amino).

As used herein, "alkylenyl" or "alkylene" used alone or as a suffix or prefix, is intended to include straight chain saturated aliphatic hydrocarbon groups having from 1 to 12 carbon atoms or if a specified number of carbon atoms is provided then that specific number is intended. For example "C1-6 alkylenyl" "C1-6 alkylene" denotes alkylenyl or alkylene having 1, 2, 3, 4, 5 or 6 carbon atoms. When the specific number denoting the alkylenyl or alkylene-group is the integer 0 (zero), a bond is intended to link the groups onto which the alkylenyl or alkylene-group is substituted. For example, "NH(C0 alkylene)NH$_2$" is equivalent to "NHNH$_2$" (hydrazino). As used herein, the groups linked by an alkylene or alkylenyl-group are intended to be attached to the first and to the last carbon of the alkylene or alkylenyl-group. In the case of methylene, the first and the last carbon is the same. For example, "H$_2$N(C2 alkylene)NH$_2$", "H$_2$N(C3 alkylene)NH$_2$", "N(C4 alkylene)", "N(C5 alkylene)" and "N(C2 alkylene)$_2$NH" is equivalent to 1,2-diamino ethane, 1,3-diamino propane, pyrrolidinyl, piperidinyl and piperazinyl, respectively.

Examples of alkyl include, but are not limited to, methyl, ethyl, n-propyl, i-propyl, n-butyl, i-butyl, sec-butyl, t-butyl, pentyl, and hexyl.

Examples of alkylene or alkylenyl include, but are not limited to, methylene, ethylene, propylene, and butylene.

As used herein, "fluoroalkyl" and "fluoroalkylene", used alone or as a suffix or prefix, refers to groups in which one, two, or three of the hydrogen(s) attached to any of the carbons of the corresponding alkyl- and alkylene-groups are replaced by fluoro.

Examples of fluoroalkyl include, but are not limited to, trifluoromethyl, difluoromethyl, fluoromethyl, 2,2,2-trifluoroethyl, 2-fluoroethyl and 3-fluoropropyl.

Examples of fluoroalkylene include, but are not limited to, difluoromethylene, fluoromethylene, 2,2-difluorobutylene and 2,2,3-trifluorobutylene.

As used herein, the term "aryl" refers to a ring structure, comprising at least one aromatic ring, made up of from 5 to 14 carbon atoms. Ring structures containing 5, 6, 7 and 8 carbon atoms would be single-ring aromatic groups, for example phenyl. Ring structures containing 8, 9, 10, 11, 12, 13, or 14 carbon atoms would be polycyclic, for example naphthyl. The aromatic ring may be substituted at one or more ring positions. The term "aryl" also includes polycyclic ring systems having two or more cyclic rings in which two or more carbons are common to two adjoining rings (the rings are "fused rings") wherein at least one of the rings is aromatic, for example, the other cyclic rings may be cycloalkyls, cycloalkenyls, cycloalkynyls, and/or aryls.

The terms ortho, meta and para apply to 1,2-, 1,3- and 1,4-disubstituted benzenes, respectively. For example, the names 1,2-dimethylbenzene and ortho-dimethylbenzene are synonymous.

As used herein, "heteroaryl" refers to an aromatic heterocycle, having at least one ring with aromatic character, (e.g. 6 delocalized electrons) or at least two conjugated rings with aromatic character, (e.g. 4n+2 delocalized electrons where "n" is an integer), and comprising up to about 14 carbon atoms, and having at least one heteroatom ring member such as sulfur, oxygen, or nitrogen. Heteroaryl groups include monocyclic and bicyclic (e.g., having 2 fused rings) systems.

As used herein, the term "substitutable" refers to an atom to which a hydrogen atom may be covalently attached, and to which another substituent may be present instead of the hydrogen atom. A non-limiting example of substitutable atoms includes the carbon-atoms of pyridine. The nitrogen-atom of pyridine is not substitutable according to this definition.

Embodiments

The present inventors have revealed that addition of aliphatic aliphatic tertiary amines, such as cyclic aliphatic tertiary amines, nucleophilic heteroaryls comprising at least one nitrogen being part of the aromatic ring, which nitrogen has one electron pair being part of the delocalized aromatic electrons and one electron pair not being part of the delocalized aromatic electrons, thereby being nucleophilic, or a tertiary, i.e. tri-substituted, nucleophilic organophosphorus compound, such as an organophosphine, e.g. triphenylphosphine, an organophosphite, e.g. triphenylphosphite, an organophosphinites, and an organophosphonites, to compositions comprising an oligomer or a polymer comprising carbon-carbon triple bonds lowers the temperature at which chain extension and/or cross-linking of the oligomers or polymers are initiated.

Accordingly, an embodiment relates to use of cyclic aliphatic tertiary amines, nucleophilic heteroaryls comprising at least one nitrogen being part of the aromatic ring, which nitrogen has one electron pair being part of the delocalized aromatic electrons and one electron pair not being part of the delocalized aromatic electrons, thereby being nucleophilic, or a tertiary, i.e. tri-substituted, nucleophilic organophosphorus compound, such as an organophosphine, e.g. triphenylphosphine, an organophosphate, e.g. triphenylphosphite, an organophosphinites, and an organophosphonites, to catalysze the chain extension and/or cross-linking of oligomers or polymers comprising carbon-carbon triple bonds.

Oligomers and polymers comprising carbon-carbon triple bonds, such as oligomers and polymers comprising resides of compounds such as PEPA, may cross-linked by heating them. Without being bound to any theory, it is believed that, upon heating of mixtures of compounds comprising ethynyl moieties, these moieties will eventually start to react. Reaction of two ethynyl moieties of separate molecules will provide a chain extended product, while reaction of three ethynyl moieties of separate molecules is thought to provide a benzene moiety with three "arms". Subsequently, two or three ethynyl moieties present on such "arms" may react to form a cross-linked product. Chain extension, but especially cross-linking, will improve the properties of an oligo- or polymer comprising ethynyl moieties, as has been shown in the art. Heat initiated chain extension, but especially cross-linking, of oligo- or polymers comprising ethynyl moieties is often referred to as curing.

The oligomer or polymer, comprising a carbon-carbon triple bond, to be chain extended and/or cross-linked may typically be present as a phenylethenyl group (i.e. ≡-Ph), eg. a PEPA-residue, EPA-residue, a residue of 5,5'-(ethyne-1,2-diyl)bis(isobenzofuran-1,3-dione) or a residue of 5-(prop-1-yn-1-yl)isobenzofuran-1,3-dione, or as a propynoyl group (i.e. ≡-C(O)—), eg. as a residue of 5-(3-phenylprop-2-ynoyl)isobenzofuran-1,3-dione.

According to an embodiment, the oligomer or polymer, comprising a carbon-carbon triple bond, to be chain extended and/or cross-linked may thus comprise a phenylethenyl group (i.e. ≡-Ph). Further, it may comprise a propynoyl group (i.e. ≡-C(O)—). Furthermore, the oligomer or polymer may comprise a group comprising a phenylethenyl group as well as propynoyl group, i.e. a Ph-≡-C(O)— group.

A nitrogen atom having one electron pair being part of the delocalized aromatic electrons and one electron pair not being part of the delocalized aromatic electrons may also be referred to as non-substitutable, as it has no hydrogen atom, which may be substituted for another group.

Without being bond to any theory, it is envisaged that the catalysis may be due to a reversible nucleophilic addition to the triple bond. Accordingly, it is preferred if the triple bond within the oligomer or the polymer is a activated by conjugation with groups such as —C(O)—, —C(O)O—, —C(O)NH—, —C(O)NC1-5 alkyl,

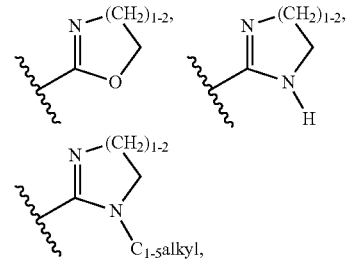

—SO$_2$—, -Ph. As an example, the triple bond may be part of residue according to the general formula R20-≡-C(O)-Ph-, wherein the phenyl group may be further substituted and is covalently bond to the oligomer or the polymer to be chain extended and/or cross-linked, and wherein R20 may be hydrogen, C1-C5 alkyl or phenyl, wherein the phenyl group may be further substituted.

Further, the triple bond may be part of a phenylethenyl group. Examples of compounds for introducing phenylethenyl groups into oligomers and polymers are known within the art and include, among others, PEPA, EPA and 5,5'-(ethyne-1,2-diyl)bis(isobenzofuran-1,3-dione).

As nitrogen atoms bearing substitutable hydrogen atoms may add irreversible to activated triple bonds, it is preferred if no nitrogen bearing substitutable hydrogen atoms is present within the aliphatic tertiary amine or the heteroaryl, i.e. any additional nitrogen atom present is preferably tertiary. According to an embodiment, the heteroaryl comprises at least one non-substitutable nitrogen atom, but no substitutable nitrogen atom.

According to an embodiment, preferred examples of nucleophilic heteroaryls are 4-diC1-5 alkylaminopyridine, such as 4-dimethylaminopyridine and 1-C1-5 alkyl imidazole, such as 1-methylimidazole. Further examples of nucleophilic heteroaryls comprise benzimidazole, triazole, pyrazole, benzpyrazole and tetrazole. In addition, other examples of nucleophilic heteroaryls include pyridine, tetrazine, triazine, oxazole, isoxazole. Additional examples of nucleophilic heteroaryls comprises quinoline, isoquinoline, alpha-picoline, beta-picoline, gamma-picoline, 2,4-lutidine, and 2,6-lutidine.

According to an embodiment, examples of cyclic aliphatic tertiary amines include 1,4-diazabicyclo[2.2.2]octane.

The corresponding protonated nucleophilic heteroaryl of the nucleophilic heteroaryl may have a p$K_a$ of at least 6, such as at least 7 or at least 9. A higher p$K_a$ indicates a more nucleophilic compound.

In order to increase the nucleophilicity, the nucleophilic heteroaryl may, according to an embodiment, be substituted with electron donating groups, such as —OC1-5 alkyl, such as methoxy, and —N(C1-5 alkyl)$_2$, such as dimethylamino. As an example, the p$K_a$ of protonated 4-dimethylaminopyridine is about 9.5, while the p$K_a$ of protonated pyridine is about 5.1. Further, the nucleophilic heteroaryl may be substituted with a C1-5 alkyl.

According to an embodiment, the nucleophilic heteroaryl is unsubstituted.

According to an embodiment, the nucleophilic heteroaryl does only comprise carbon, nitrogen, optionally oxygen, and covalently bond hydrogen atoms. However, the nucleophilic heteroaryl used, may be added as a protonated salt, such as a HCl-salt.

Although the nucleophilic heteroaryl may comprise amino groups, these groups, if present, are, as disclosed above, typically tertiary. Further, said nucleophilic heteroaryl may be mono-cyclic.

According to an embodiment, the aliphatic tertiary amine does only comprise carbon, nitrogen and covalently bond hydrogen atoms. However, the aliphatic tertiary amine used may be added as a protonated salt, such as a HCl-salt. Further, if more than one nitrogen atom is present in the aliphatic tertiary amine, also the additional nitrogen(s) are preferably tertiary. An example of a tertiary amine comprising more than one tertiary nitrogen atom is 1,4-diazabicyclo[2.2.2]octane.

According to an embodiment the aliphatic tertiary amine, may be a linear aliphatic tertiary amine may be represented by the general formula NR10R11R12, wherein R10 to R12, independently of each other, are selected from C1-C5 alkyls.

However, linear aliphatic tertiary amines have been shown to be less effective in catalyzing the chain extension and/or cross-linking of an oligomer or a polymer comprising carbon-carbon triple bonds. Thus, the catalyst is preferably a cyclic aliphatic tertiary amine, a tertiary nucleophilic organophosphorus compound, or a nucleophilic heteroaryl comprising at least one nitrogen being part of the aromatic ring, which nitrogen has one electron pair being part of the delocalized aromatic electrons and one electron pair not being part of the delocalized aromatic electrons.

According to an embodiment, the heteroaryl may be a compound according to formula (Xa to Xj),

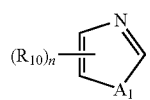
(Xa)

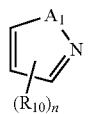
(Xb)

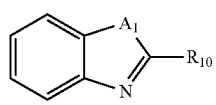
(Xc)

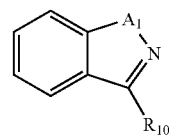
(Xd)

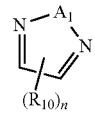
(Xe)

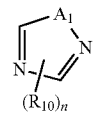
(Xf)

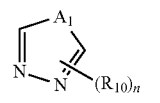
(Xg)

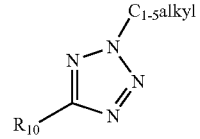
(Xh)

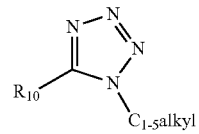
(Xi)

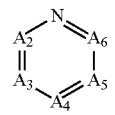
(Xj)

wherein

A1 is NC1-5 alkyl, or "O" (oxygen), such as being NC1-5 alkyl;

A2 to A6 is independently selected from CH, CR10, and "N" (nitrogen), wherein at least two of A2 to A6 are, independent of each other, CH or CR10;

"n" is an integer of 0 (zero) to 3, such as 0 (zero) or 1;

R10 may be attached to any substitutable atom of (Xa), (Xb) and (Xe) to (Xg); and R10 is selected, independently if more than one R10 is present, from C1-5 alkyl, such as methyl, OC1-5 alkyl, such as methoxy, N(C1-5 alkyl)$_2$, such as dimethylamino, and aryl such, as phenyl.

In compounds according to formula (Xj), it is preferred if A4 is CR10. In compounds according to formula (Xa), wherein the integer "n" is distinct from 0 (zero), such as being 1, it is preferred if the carbon in position 2, i.e. the carbon between N, being in position 1, and A$_1$, being in position 3, is substituted.

According to an embodiment, the heteroaryl may be a compound according to formula (Xa), (Xc), or (Xj). In compounds according to formula (Xi), A2, A3, A5 and A6 may all be CH. Further, A1 in formula (Xa) and (Xc) may be NC1-5 alkyl.

As an example:

A compound according to formula Xa may be 1-methylimidazole;

A compound according to formula Xb may be 1-methylpyrazole;

A compound according to formula Xc may be 1-methylbenzimidazole;

A compound according to formula Xd may be 1-methylbenzpyrazole;

A compound according to formula Xe may be 2-methyl-1,2,3-triazole;

A compound according to formula Xf may be 1-methyl-1,2,4-triazole;

A compound according to formula Xg may be oxadiazole;

A compound according to formula Xh may be 2-methyltetrazole;

A compound according to formula XI may be 1-methyltetrazole; and

A compound according to formula Xj may be 4-dimethylaminopyridine;

According to an embodiment, the tertiary nucleophilic organophosphorus compound may be a compound according to formula (XII)

$$PR_{15}R_{16}R_{17} \quad (XII)$$

wherein

R15, R16, and R17 are, independently of each other, selected from the group consisting of C1-5 alkyl, aryl, such as phenyl, OC1-5 alkyl, and Oaryl, such as phenoxy. Said aryl and Oaryl may be substituted.

Examples of tertiary, nucleophilic organophosphorus compound include triphenylphosphine (PPh$_3$), tributylphosphine (PBu$_3$), trimethylphosphine (PMe$_3$), phenyl dimethylphosphine (PPhMe$_2$), triphenylphosphite (P(OPh)$_3$), phenyldiphenylphosphonite (PPh(OPh)$_2$), phenyldiphenylphosphinite (PPh$_2$OPh) among others.

Further, addition of a compound according to formula (I) or (II),

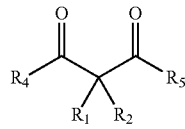

(I)

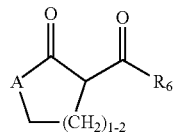

(II)

wherein

R1 and R2, independently of each other, are hydrogen or C1-4 alkyl, such as methyl;

R4 and R5, independently of each other, are C1-5 alkyl, such as methyl or ethyl, or OC1-5 alkyl, such as methoxy or ethoxy;

A is O, NC1-5 alkyl, such as NMe, or CH2; and

R6 is C1-5 alkyl, such as methyl or ethyl, or OC1-5 alkyl, such as methoxy or ethoxy;

has been found to promote cross-linking over other reactions, such as chain extension. Thus, such compound may be regarded as co-catalysts for cross-linking in the presence of aliphatic tertiary amines, tertiary nucleophilic organophosphorus compounds or nucleophilic heteroaryls.

Examples of co-catalysts according to formula (I) include acetylacetone (2,4-pentanedion), dimethyl acetylacetone, and diethyl malonate. Examples of co-catalysts according to formula (II) include 2-acetylbutyrolactone and 2-acetyl-cyclopentanone.

A co-catalyst according to formula (I) may be symmetrical. Further, R1 may be hydrogen. Similar, also R2 may be hydrogen.

According to an embodiment, the co-catalyst is a compound according to formula (I) or (II), such as a compound according to formula (I).

An embodiment thus relates to use of an aliphatic tertiary amine, as disclosed herein, such as 1,4-diazabicyclo[2.2.2]octane, a tertiary nucleophilic organophosphorus compound, such as triphenylphosphine and triphenylphosphite, or a nucleophilic heteroaryl, as disclosed herein, such as 4-dimethylaminopyridine and 1-methylimidazole, as catalyst for chain extension and/or cross-linking of oligomers or polymers comprising carbon-carbon triple bonds. The carbon-carbon triple bonds may be part of groups such as, phenylethenyl groups (i.e. -Ph), eg. a PEPA-residue, an EPA-residue or a residue of 5-(prop-1-yn-1-yl)isobenzofuran-1,3-dione, and propynoyl groups (i.e. —≡—C(O)—), eg. a residue of 5-(3-phenylprop-2-ynoyl)isobenzofuran-1,3-dione.

Such use may optionally also include the use of a co-catalyst according to formula (I) or (II), as disclosed herein.

Such use typically comprises use of at least 5 mole percent, such as at least 10, 25, or 50 mole percent, of the aliphatic tertiary amine, the tertiary nucleophilic organophosphorus compound or the nucleophilic heteroaryl with respect to the amount of triple bonds present.

Further, the molar ratio between the aliphatic tertiary amine, the tertiary nucleophilic organophosphorus compound, or the nucleophilic heteroaryl and the co-catalyst, if present, may be from about 5:1 to about 1:5, such as about 2:1 to about 1:5 or about 1:1 to about 1:3

According to an embodiment, a catalyst mixture to be used for chain extension and/or cross-linking may comprise an aliphatic tertiary amine, a tertiary nucleophilic organophosphorus compound or a nucleophilic heteroaryl, a co-catalyst, and optionally a solvent, as disclosed herein. The components may be present in molar ratios of about 1-5:1-5:1-10, such as about 1:1:2 (aliphatic tertiary amine/tertiary nucleophilic organophosphorus compound/nucleophilic heteroaryl:co-catalyst:solvent).

Examples of solvents to be included in such a catalyst mixture include gamma-butyrolactone, N-methylpyrrolidone, meta-cresol, dimethylacetamide and tetrahydrofuran. Aspects of the various solvents are described herein below.

In an embodiment the co-catalyst may act as solvent as well. Thus, the possible need for a separate solvent may be dispensed with. Similarly, also the catalyst may act as solvent.

The aliphatic tertiary amine, the tertiary nucleophilic organophosphorus compound or the nucleophilic heteroaryl, as wells as the co-catalyst, may have a boiling point of about 150-220° C., respectively.

The aliphatic tertiary amine, the tertiary nucleophilic organophosphorus compound, or the nucleophilic heteroaryl and the co-catalyst may during and/or subsequent to chain extension and/or cross-linking be evaporated. Similarly, any solvent present may also be evaporated during and/or subsequent to chain extension and/or cross-linking As gamma-butyrolactone, N-methylpyrrolidone, and meta-cresol, which are commonly used solvents in polymer synthesis, each has a boiling point of just above 200° C., it is preferred if the aliphatic tertiary amine or the nucleophilic heteroaryl and the co-catalyst, if used, each has a boiling point of less than about 220° C.

Further, also solvents with lower boiling points, such as dimethylacetamide and tetrahydrofuran, may be used.

Other solvents useful for chain extension and/or cross-linking of oligomers or polymers, such as oligo- and polyimides, comprising carbon-carbon triple bonds, include cyclopentanone and ortho-dichlorobenzene.

According to an embodiment, the solvent may be an aprotic solvent, such as dimethylacetamide, dimethylformamide or N-Methylpyrrolidone. Further examples of solvents and mixtures of solvents comprises cresol, cresol/toluene, N-Methylpyrrolidone/orto-dichlorobenzene, benzoic acid, and nitrobenzene. Even further examples of solvents comprises:

Phenol solvents, such as phenol, o-chlorophenol, m-chlorophenol, p-chlorophenol, o-cresol, m-cresol, p-cresol, 2,3-xylenol, 2,4-xylenol, 2,5-xylenol, 2,6-xylenol, 3,4-xylenol, and 3,5-xylenol;

Aprotonic amide solvents, such as N,N-dimethylformamide, N,N-dimethylacetamide, N,N-diethylacetamide, N-methyl-2-pyrrolidone, 1,3-dimethyl-2-imidazolidine, N-methylcaprolactam, and hexamethylphosphorotriamide;

Ether solvents, such as 1,2-dimethoxyethane, bis(2-methoxyethyl)ether, 1,2-bis(2-methoxyethoxy)ethane, tetrahydrofuran, bis[2-(2-methoxyethoxy)ethyl]ether, 1,4-dioxane, and diphenyl ether;

Tertiary amine solvents, such as trimethylamine, triethylamine, tripropylamine, and tributylamine; as well as Other solvents, such as dimethyl sulfoxide, dimethyl sulfone, sulphorane, diphenyl sulfone, tetramethylurea, anisole, isophorone, and water.

The boiling point of the aliphatic tertiary amine, the tertiary nucleophilic organophosphorus compound, or the nucleophilic heteroaryl, the co-catalyst and any solvent present, should be as low as possible to facilitate evaporation after chain extension and/or cross-linking has taken place. On the other hand, a low boiling point may imply that the aliphatic tertiary amine, the tertiary nucleophilic organophosphorus compound, or the nucleophilic heteroaryl, the co-catalyst and/or any solvent present, will evaporate before chain extension and/or cross-linking has taken place. Accordingly, the boiling point of the aliphatic tertiary amine or the nucleophilic heteroaryl, the co-catalyst and/or any solvent present, may, according to an embodiment, be higher than 150° C.

In some applications, such as in employing water heating, catalysts, co-catalysts and solvents with boiling points lower than 100° C. may be used. In such applications, as in all applications, the catalyst and the amount of catalyst should preferably be selected to provide chain extension and/or cross-linking at lower temperatures than the boiling point of the solvent.

Another embodiment relates to a method of chain extending and/or cross-linking an oligomer or a polymer comprising at least one carbon-carbon triple bond. In such a method a catalyst, such as an aliphatic tertiary amine, a tertiary nucleophilic nucleophilic organophosphorus compound, or a nucleophilic heteroaryl, may be mixed with oligomer or a polymer comprising a carbon-carbon triple bond. Typically, although not necessary, they are mixed in a solvent. Further, also a co-catalyst may be added to the mixture. Furthermore, additional oligomers or polymers, such as an oligo- or polyimide, fillers, reinforcements, pigments, and plasticizers may be added to the mixture. Subsequent to mixing the catalyst and the oligomer or the polymer comprising the carbon-carbon triple bond, the mixture may be heated to initiate chain extension and/or cross-linking. However, before or parallel to initiating chain extension and/or cross-linking, shaping of the mixture into an article, such as a film, may be performed. Such shaping may be accordance with methods within the art.

As an example, catalysis of chain-extension and/or cross-linking may be used in castings of films, such as oligo- or polyimides films. Casting of films typically involves use of a solvent, in which the oligomer or polymer is dissolved. Polymer films may be obtained by film casting or spin casting. A further example of shaping is printing, such as ink jet or screen printing.

A method of chain extending and/or cross-linking an oligomer or a polymer comprising at least one carbon-carbon triple bond may thus comprise the steps of:

providing a composition comprising an aliphatic tertiary amine, a tertiary nucleophilic organophosphorus compound, or a nucleophilic heteroaryl, as disclosed herein, optionally a co-catalyst, as disclosed herein, an oligomer or a polymer comprising a carbon-carbon triple bond and optionally at least one additional polymer, such as an oligo- or polyimide, filler, reinforcement, pigment, plasticizer and/or solvent, such as disclosed herein;

heating the composition to initiate chain extension and/or cross-linking to obtain a chain extended and/or cross-linked polymer; and optionally evaporating the aliphatic tertiary amine or the nucleophilic heteroaryl, the co-catalyst, if present, and/or the solvent, if present, during or subsequent to the chain extension and/or cross-linking According to an embodiment, the composition is chain extended and/or cross-linked at a temperature of less than about 220° C. The possibility to chain extend and/or cross-link at such low temperatures may be advantageous to prevent oxidation and/or degradation of the oligomer or the polymer.

As is apparent from the appended examples, the temperature at which chain extension and/or cross-linking is initiated is affected by various parameters. These include the type of catalyst, co-catalyst and solvent employed. Further, the parameters also include the amount of the catalyst and the co-catalyst used. Accordingly, the chain extension and/or cross-linking temperature may thus be adjusted by varying these parameters.

The heating may be, upon and/or subsequent to shaping, such as extrusion, casting or molding, of the oligomer or the polymer composition. Further, the heat inducing the chain extension and/or cross-linking reaction of the triple bonds may be provided externally or in situ generated.

By increasing the heat and/or lowering the surrounding pressure, aliphatic tertiary amine or the nucleophilic heteroaryl, any co-catalyst and/or any solvent present may be, at least partly, evaporated during and/or subsequent to the chain extension and/or cross-linking In an embodiment, the oligomer or the polymer comprising carbon-carbon triple bond to be chain extended and/or cross-linked is obtainable by use of PEPA (phenylethynyl phtalic anhydride), EPA (ethynyl phtalic anhydride), 5,5'-(ethyne-1,2-diyl)bis(isobenzofuran-1,3-dione) (ethynyl bis phtalic anhydride; EBPA) and/or 5-(prop-1-yn-1-yl)isobenzofuran-1,3-dione(methylethynyl phtalic anhydride; MEPA).

A polymer or an oligomer obtainable by use of PEPA, EPA, MEPA and/or EBPA, may be an oligo- or polyimide. Further, also polyamides may be obtained by use of PEPA, EPA, MEPA and/or EBPA. It also envisaged, that poly(alkylene phthalate), such as poly(butylene terephthalate) and poly(ethylene terephthalate), may be obtained by use PEPA, EPA, MEPA and/or EBPA.

Furthermore, also acetylenic epoxy resins may be obtained by use of PEPA, EPA, MEPA and/or EBPA. In addition to catalyzing the chain extension and/or cross-linking via the carbon-carbon triple bonds, also epoxy hardening may be catalyzed by the herein disclosed catalysts.

In an embodiment, the oligomer or the polymer comprising carbon-carbon triple bond to be chain extended and/or cross-linked is obtainable by use of 5-(3-phenylprop-2-ynoyl)isobenzofuran-1,3-dione, also denoted PETA (PhenylEthynylTrimelleticAnhydride), as monomer or as end-capper. PETA has the structure indicated below.

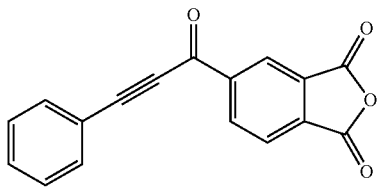 [SMILES: O=C(C#Cc1ccccc1)c1ccc2c(c1)C(=O)OC2=O]

A polymer or an oligomer obtainable by use of PETA as end-capper, may be an oligo- or polyimide. Further, also polyamides may be end-caped by use of PETA.

Similar to PEPA also other acetylenical oligomers or polymers may be obtained by use of PETA. Polymers, which may be obtained as acetylenical polymers by use of PETA, comprise poly(alkylene phthalate), such as poly(butylene terephthalate) and poly(ethylene terephthalate), phenol-aldehyde resins and epoxy resins.

Further, the oligomer or the polymer comprising carbon-carbon triple bond to be chain extended and/or cross-linked may be an oligomer or a polymer comprising a residue according to formula (IV),

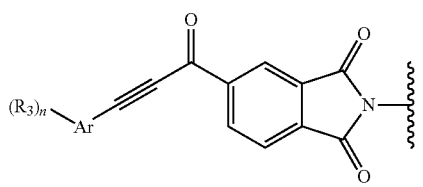

(IV)

wherein the waved line indicates the point of attachment to the oligomer or the polymer;

"Ar" is an aryl, such a phenyl, or a heteroaryl;

R3 is, independently if "n" is 2 or more, selected from the group consisting of C1-4 alkyl, OC1-4 alkyl, halogen, cyano, nitro, C1-4 fluoroalkyl;

the substituent(s) R3 may be connected to any substitutable atom(s) of "Ar"; and "n" is an integer from 0 (zero) to 5.

In such an oligomer or a polymer, Ar may be phenyl. Further, the integer "n" may be 0 (zero).

Further, the oligomer or the polymer comprising carbon-carbon triple bond to be chain extended and/or cross-linked may be an oligomer or a polymer comprising a residue according to formula (IV1), (IV2) or (IV3),

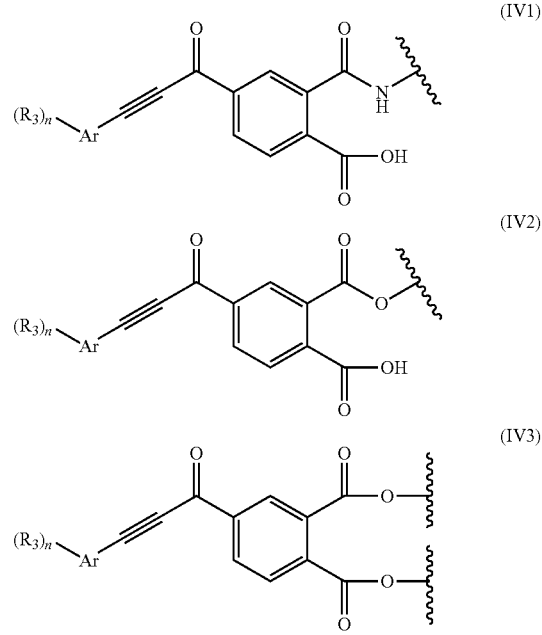

wherein the waved line indicates the point of attachment to the oligomer or the polymer;

"Ar" is an aryl, such a phenyl, or a heteroaryl;

R3 is, independently if "n" is 2 or more, selected from the group consisting of C1-4 alkyl, OC1-4 alkyl, halogen, cyano, nitro, C1-4 fluoroalkyl;

the substituent(s) R3 may be connected to any substitutable atom(s) of "Ar"; and "n" is an integer from 0 (zero) to 5.

In such an oligomer or a polymer, Ar may be phenyl. Further, the integer "n" may be 0 (zero).

In addition, the oligomer or the polymer comprising carbon-carbon triple bond to be chain extended and/or cross-linked may be an oligomer or a polymer comprising a residue according to formula (IVa) or (IVb),

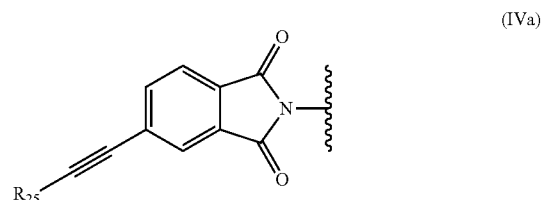

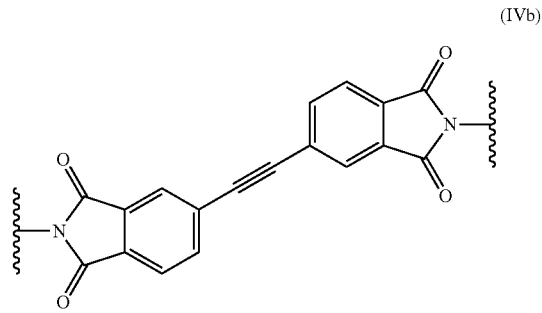

wherein

R25 is hydrogen, C1-5 alkyl, such as methyl, or phenyl, which phenyl may be substituted by halogen, C1-5-alkyl, trifluoromethyl; and the waved line(s) indicate(s) the point of attachment(s) to the oligomer or the polymer.

Furthermore, the oligomer or the polymer comprising carbon-carbon triple bond to be chain extended and/or crosslinked may be an oligomer or a polymer comprising a residue according to formula (IVa1), (IVa2), (IVa3), (IVb1), (IVb2) or (IVb3),

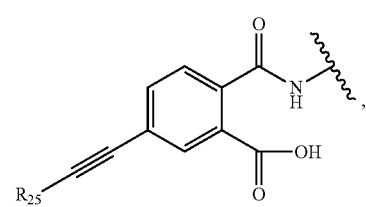
(IVa1)

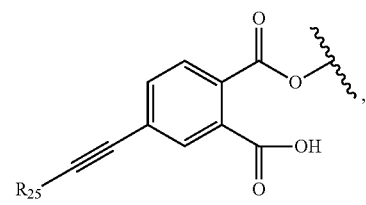
(IVa2)

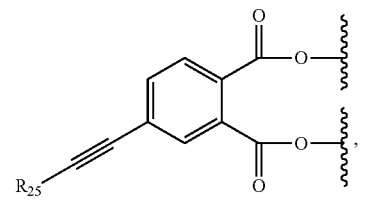
(IVa3)

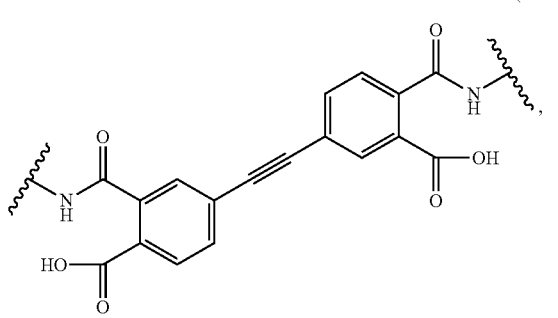
(IVb1)

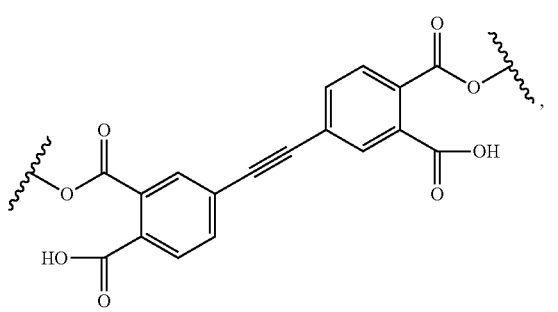
(IVb2)

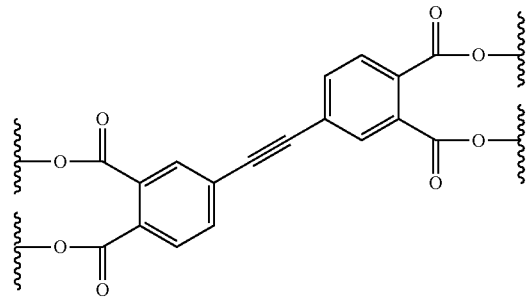
(IVb3)

wherein

R25 is hydrogen, C1-5 alkyl, such as methyl, or phenyl, which phenyl may be substituted by halogen, C1-5-alkyl, trifluoromethyl; and the waved line(s) indicate(s) the point of attachment(s) to the oligomer or the polymer.

Another embodiment relates to composition comprising an aliphatic tertiary amine, a tertiary nucleophilic nucleophilic organophosphorus compound, or a nucleophilic heteroaryl, as disclosed herein, optionally a co-catalyst, as disclosed herein, optionally a solvent, as disclosed herein, and an oligomer or a polymer comprising a carbon-carbon triple bond, such as an oligomer or a polymer comprising a residue according to formula (IV), (IV1), (IV2), (IV3), (IVa), (IVa1), (IVa2), (IVa3), (IVb), (IVb1), (IVb2), or (IVb3), such as according to formula (IV), (IVa) or (IVb), eg. an oligomer or a polymer comprising a residue according to formula (IV).

According to another embodiment the composition may further comprise at least one additional polymer, such as an oligo- or polyimide, filler, reinforcement, pigment, plasticizer and/or solvent, such as N-methylpyrrolidone.

An oligomer or a polymer comprising a residue according to formula (IV), (IVa) or (IVb) may be an oligo- or polyimide. Typically, such an oligo- or polyimide comprises at least one residue of an aromatic dianhydride and at least one residue of an aromatic diamine.

According to an embodiment, the aromatic diamine may be 1,4-diaminobenzene, 1,3-diaminobenzene, or a diamine according to the general formula (XXI)

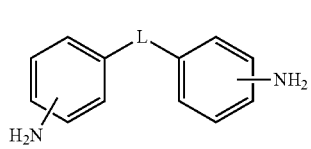
(XXI)

wherein the amino groups may be connected to any substitutable carbon atom in the benzene residues, i.e. to the 2-, 3- or 4-position, and the 2', 3', or 4'-position, respectively; and "L" is a direct bond or a moiety selected from the group consisting of —O—, —S—, —C(O)—, —C(CH3)2—, —C(CF3)2—, —CH2—, 3-oxyphenoxy group, 4-oxyphenoxy group, 4'-oxy-4-biphenoxy group, and 4-[1-(4-oxyphenyl)-1-methylethyl]phenoxy group.

Preferably, the amino groups are connected to the 3- or 4-position of the respective benzene residues. Symmetric di-amines, eg. 3,3'- and 4,4'-substited di-amines according to general formula (XXI), as well as asymmetric di-amines, eg. 3,4'-, or 4,3'-substited di-amines according to general formula (XXI), are equally possible.

As well known in the art, asymmetric aromatic diamines and dianhydrides may be used to prepare polyimides with a bent and rotationally hindered structure resulting in high Tg but also in improved processability and high melt fluidity along with and solubility of the resin in organic solvent.

According to an embodiment, the aromatic dianhydride may be pyromellitic dianhydride or a dianhydride according to the general formula (XX),

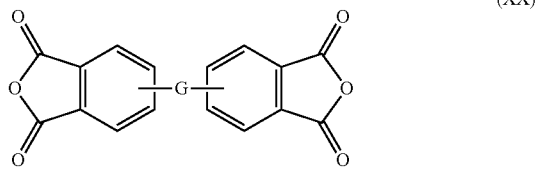

(XX)

wherein "G" represents a direct bond or a di-valent group selected from the group consisting of a carbonyl group, a methylene group, a sulfone group, a sulfide group, an ether group, an —C(O)-phenylene-C(O)— group, an isopropylidene group, a hexafluoroisopropylidene group, a 3-oxyphenoxy group, a 4-oxyphenoxy group, a 4'-oxy-4-biphenoxy group, and a 4-[1-(4-oxyphenyl)-1-methylethyl]phenoxy group; and wherein "G" may be connected to the 4- or 5-position and the 4'- or the 5"-position, respectively, in the isobenzofuran-1,3-dione residues.

Symmetric aromatic dianhydrides as well asymmetric aromatic dianhydrides are equally possible.

According to an embodiment, an oligomer or a polymer comprising a residue according to formula (IV), (IVa) or (IVb) may further comprise at least one residue of an aromatic dianhydride selected from the group consisting of pyromellitic dianhydride, 4,4'-oxydiphthalic anhydride, 2,2-bis-[4-(3,4-dicarboxyphenoxy)phenyl]-propane dianhydride, 3,3',4,4'-benzophenonetetracarboxylic acid dianhydride, 3,3',4,4'-tetracarboxybiphenyl dianhydride, 4,4',5,5'-sulfonyldiphthalic anhydride, and 5,5'-(perfluoropropane-2,2-diyl)bis(isobenzofuran-1,3-dione) and at least one residue of an aromatic diamine selected from the group consisting of 4,4'-oxydianiline, 1,4-diaminobenzene, 1,3-diaminobenzene, 1,3-bis-(4-aminophenoxy)benzene, 1,3-bis-(3-aminophenoxy)benzene, methylenedianiline, and 3,4'-oxydianiline.

An oligo- or polyimide comprising a carbon-carbon triple bond may have a number average molecular weight of about 1,000 to 20,000, such as from about 2,500 to 10,000. The number average molecular weight, as well as the weight average molecular weight, may be determined with gel permeation chromatography (GPC) or size exclusion chromatography (SEC), by use a of a combination multi-angle light scattering (MALS) detection and refractive index (RI) detection.

An oligoimide comprising a carbon-carbon triple bond, may, according to an embodiment, have a weight average molecular weight of about 1,000 to 10,000, such as from about 2,500 to 7,5000. Further, a polyimide comprising a carbon-carbon triple bond may, according to an embodiment, have a weight average molecular weight of about 1,000 to 200,000, such as from about 25,000 to 100,000.

According to an embodiment, Ar in formula (IV) is phenyl. Further, the integer "n" may be 0 (zero).

The dissertation thesis "*Synthesis and characterization of thermosetting polyimide oligomers for microelectronics packaging*" by Debra Lynn Dunson, Va. Polytechnic Institute and State University, from 2000, provides guidance for the preparation of PEPA end-capped oligo- and polyimides. Similar procedures may be employed to prepare oligo- and polyimides comprising residues of other cross-linkers disclosed herein, eg. EPA, EBPA, MEPA and PETA. Further, the dissertation thesis provides guidance for methods of casting and curing of polyimide films. Thus, the dissertation thesis "Synthesis and characterization of thermosetting polyimide oligomers for microelectronics packaging" by Debra Lynn Dunson, Va. Polytechnic Institute and State University, from 2000 is incorporated herein by reference.

Another embodiment relates to an article comprising an oligomer or a polymer, such as an oligo- or polyimide, comprising a residue according to formula (IV), which has been chain extended and/or cross-linked by the method disclosed herein. Typically examples of articles comprising such oligo- or polyimides comprise flexible films for electronics, wire isolation, wire coatings, wire enamels, ink, and load-bearing structural components.

Without further elaboration, it is believed that one skilled in the art can, using the preceding description, utilize the present invention to its fullest extent. The preferred specific embodiments described herein are, therefore, to be construed as merely illustrative and not limitative of the remainder of the description in any way whatsoever. Further, although the present invention has been described above with reference to specific embodiments, it is not intended to be limited to the specific form set forth herein. Rather, the invention is limited only by the accompanying claims and, other embodiments than the specific above are equally possible within the scope of these appended claims, e.g. different than those described above.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous.

In addition, singular references do not exclude a plurality. The terms "a", "an", "first", "second" etc do not preclude a plurality.

EXPERIMENTAL

The following examples are mere examples and should by no mean be interpreted to limit the scope of the invention. Rather, the invention is limited only by the accompanying claims.

ABBREVIATIONS 4,4-ODA 4,4'-oxydianiline
AA Acetyl Acetoacetonate
ABL Acetyl Buryro Lactone
BPDA 3,3',4,4'-Biphenyl tetracarboxylic dianhydride
DEM DiEthyl Malonate
DMAA DiMethyl Acetyl Acetoacetonate
DMAP DiMethyl Amino Pyridine
EPA Ethynyl phtalic anhydride
MI N-Methyl Imidazole
NMP N-Methyl-2-pyrrolidone
o-DCB ortho-DiChloro Benzene
PETA Phenylethynyl trimelletic anhydride (5-(3-phenyl-prop-2-ynoyl)isobenzofuran-1,3-dione)
PEPA Phenylethynyl phtalic anhydride
PETI Phenyl ethynyl terminated imide oligomer

5-(3-phenylprop-2-ynoyl)isobenzofuran-1,3-dione (PhenylEthynylTrimelleticAnhydride; PETA)

0.16 g of palladium acetate (0.78 mmol) was added to a mixture of 300 ml toluene, 54.6 ml triethyl amine (0.39 mol), 43 ml phenyl acetylene (0.39 mol) and 75 g of trimellitic anhydride chloride (0.36 mol). The mixture was stirred at rt for 1.5 h, whereupon 16.5 ml triethyl amine (0.12 mol) was added. The mixture was stirred for additionally 1 h, whereupon the resulting solid was filtered of. The solid was washed with 150 ml toluene, and then suspended in 750 ml ethyl acetate. The mixture was refluxed for 30 min, whereupon it was filtered on a bed of silica gel. The filtrate was concentrated under vacuum, and the precipitate formed was filtered of, and washed with toluene. The solid was dried under vacuum to give 39 g of PETA (0.14 mol), $^1$H NMR (400 MHz, CDCl$_3$): δ 8.84 (q, 1H, J=1.4 Hz), 8.74 (dd, 1H, J=7.8 Hz), 8.22 (dd, 1H, J=8.0 Hz), 7.77 (m, 1H) 7.59 (m, 2H), 7.51 (m, 2H).

Prior to analysis, the product was hydrolysis in methanol containing 2% sulfuric acid to provide two regio isomers. The regio isomers was analyzed by LC/UV/MS performed on an Agilent 1100 system comprised of a degasser, binary pump, autosampler, single wavelength UV detector, operating at 254 nm, and a single quadrupole mass detector, equipped with an electrospray ionization source, operating in single ion monitoring. The mobile phase was H$_2$O:Methanol (50/50) with 0.1% acetic acid and the separation column (150 mm*2 mm) was packed with octadecyl coated silica particles with an average diameter of 3 μm. The two regio isomers, obtained by the hydrolysis of PETA, had retention factors of 2.64 and 2.93, respectively. Both isomers were found to form ions with m/z's: 277, 309 and 331.

5-(prop-1-yn-1-yl)isobenzofuran-1,3-dione (MEPA)

Bromophtalic anhydride (50.0 g, 0.22 mol), triethylamine (33.8 mL, 0.24 mol) and toluene (220 mL) were mixed in a glass reactor over nitrogen (g) atmosphere at room temperature. Bis(triphenylphosphine)palladiumchloride (0.77 g, 0.001 mol), CuI (0.42 g, 0.002 mol) and triphenylphosphine (0.87 g, 0.003 mol) were added and the temperature was raised to 50° C. Propyne (18.0 g, 0.45 mol) was slowly added through a gas inlet during 3 hours. The reaction mixture was filtered through a glass filter funnel and the solution was concentrated to dryness to give crude solid product (40.1 g, 98%). The product was re-crystallized from toluene to give a light yellow solid (24.7 g, 60%).

Melting Point of MEPA
109-110° C. (as determined with DSC)
H-NMR of MEPA
1H NMR (400 MHz, d-DMSO): δ=2.15 (s, 3H), 7.94-8.05 (m, 3H).

HPLC-MS of Methanolyzed MEPA

Approximately 3 mg MEPA was dissolved in anhydrous MeOH at a concentration of 1 mg/mL. The solution was sonicated for 30 minutes. 200 μL MEPA solution were mixed with 300 μL MeOH:HOAc (100:0.1), (A), and 300 μL H2O:MeOH:HOAc (95:5:0.1), (B). The resulting mixture was injected onto the LC/UV/MS (inj. vol. 2 μL) Separation was performed on a Dr. Maisch Reprosphere C18 AQ column (100×2.1 mm; dp 3 μm). The mobile phase was comprised of 40% A and 60% B and the flow rate was 0.100 mL/min. UV detection was performed at 254 nm and the MS operated in positive ion scanning mode m/z 190-260. A peak with R$_t$ 15.6 min, corresponding to methyl ethynyl phthalic acid (MH$^+$ 205 and MNa$^+$ 227), and two peaks with R$_t$ 26.7 and 29.4, respectively, corresponding to the two region isomers of methyl ethynyl phthalic acid mono-methyl ester (MH$^+$—H$_2$O 201 and MNa$^+$ 241), were seen.

m-Phenylenediamine End-Capped with PETA

PETA (1.0 g, 3.6 mmol), m-phenylenediamine (1.9 mmol) and acetic acid (8 mL) were mixed in a glass reactor and heated to 60° C. over night. The reaction mixture was allowed to cool down to room temperature and precipitation was filtered off. The solid product was treated with heptane (10 mL), filtered and dried to a give p-phenylenediamine end-capped with PETA as a yellowish/brown product (1.1 g, 1.8 mmol) in 93% yield.

The same procedure described above to obtain PETA end-capped phenylenediamine was used as well for the corresponding phenylenediamine end-capped with EPA and PEPA, respectively.

Examples 1-26 m-Phenylenediamine end-capped with EPA, PEPA or PETA was analyzed in the absence as well in the presence of catalyst and/or co-catalyst and/or solvent by differential scanning calorimetry (DSC) using a TA instrument DSC Q2000 with a ramp of 10° C./min. As the reactions are temperature and time dependant, running the experiments isothermally or with a faster or slower temperature gradient may result in different threshold values for the catalysis and stabilities of the product.

The results are summarized in Table 1 below. It is to be noted that the mol % given in Table 1 is in relation to the PETA-residue, i.e. in relation to the triple bonds present, not to m-Phenylenediamine.

TABLE 1

| Example | Crosslinker | Catalyst | Co-Catalyst | Solvent | Cure Onset | Comment |
|---|---|---|---|---|---|---|
| 1 | None | None | None | DEM | — | Background/Interference |
| 2 | None | None | None | MI | — | Background/Interference |
| 3 | None | None | None | NMP | — | Background/Interference |
| 4 | PD-EPA | None | None | None | 235 | No catalyst |
| 5 | PD-EPA | DMAP | None | None | 140 | |
| 6 | PD-PEPA | None | None | None | 300 | No catalyst |
| 7 | PD-PEPA | DMAP | None | None | 235 | Bimodial cure |
| 8 | PD-PEPA | PPh3 | None | None | 200 | Bimodial cure |
| 9 | PD-PETA | None | None | None | 215 | No catalyst |
| 10 | PD-PETA | PPh3 | None | None | 162 | 10 wt % Catalyst |
| 11 | PD-PETA | Bu3N | None | None | 138 | |
| 12 | PD-PETA | DMAP | AA | None | 48 | 3.2 mg PETA; 12.5 mg AA/DMAP 8:1 (weight ratio) |

TABLE 1-continued

| Example | Crosslinker | Catalyst | Co-Catalyst | Solvent | Cure Onset | Comment |
|---|---|---|---|---|---|---|
| 13 | PD-PETA | MI | ABL | None | 70 | |
| 14 | PD-PETA | MI | DMAA | None | 66 | |
| 15 | PD-PETA | MI | None | None | 100 | |
| 16 | PD-PETA | None | None | m-Cresol | >160 | DSC run terminated at 160° C. |
| 17 | PD-PETA | MI | None | m-Cresol | 148 | |
| 18 | PD-PETA | MI | DEM | NMP | 84 | MI/DEM/NMP 1:1:2 (weight ratio) |
| 19 | PD-PETA | MI | AA | NMP | 87 | MI/AA/NMP 1:0.5:2 (weight ratio) |
| 20 | PD-PETA | Bu3N | None | o-DCB | 114 | |
| 21 | PD-PETA | None | None | o-DCB | >160 | DSC run terminated at 160° C. |
| 22 | PD-PETA | MI | None | o-DCB | 63 | 158 mol % MI |
| 23 | PD-PETA | MI | None | o-DCB | 95 | 75 mol % MI |
| 24 | PD-PETA | MI | DEM | o-DCB | 69 | 117 mol % MI; 293 mol % DEM |
| 25 | PD-PETA | MI | DEM | o-DCB | 86 | 49 mol % MI; 123 mol % DEM |
| 26 | PD-PETA | MI | DEM | o-DCB | 86 | 26 mol % MI; 64 mol % DEM |

As is apparent from Examples 4, 6 and 9 in comparison to 5, 7-8, 10-15, 17-20, and 22-26, respectively, in Table 1, the presence of catalysts significantly lowered the temperature at which chain extension and/or cross-linking is initiated.

Furthermore, the presence of co-catalysts significantly lowered the temperature at which chain extension and/or cross-linking is initiated, as is apparent from Examples 15 in comparison to examples 13 and 14.

As is apparent from Examples 15, 17, 21 and 22, respectively, not only the presence of a catalyst and/or co-catalysts, but also a solvent may affect the temperature at which chain extension and/or cross-linking is initiated.

As is apparent from Example 11, not only nucleophilic heteroaryls, but also aliphatic tertiary amines may act as catalysts. However, as is apparent from example 11 in comparison to example 15, aliphatic tertiary amines are less effective catalysts.

As is apparent from Example 10 in comparison to example 9 and from example 6 in comparison to example 8, not only nucleophilic heteroaryls, but also tertiary nucleophilic organophosphorus compound may act as catalysts.

As is apparent from Example 22-26, the temperature at which chain extension and/or cross-linking is initiated by the amount of catalyst present as well as by the optional presence of a co-catalyst.

Example 27-29 m-Phenylenediamine end-capped with PETA was dissolved in dicholormethane (1.5 g/20 ml) at room temperature. In example 27 no further additive was added while in example 2825 wt % of 1-methylimidazole was added and in example 2925 wt % of piperidine, a nucelophilic non-tertiary amine, was added.

After 18 h at room temperature, the solutions where analyzed by a thermo gravimetric method using a TA instrument TGA Q50 with a ramp of 20° C./min. As the reactions are temperature and time dependant, running the experiments isothermally or with a faster or slower temperature gradient may result in different threshold values for stabilities of the products.

The solutions where also analyzed using a Brucker 400 MHz NMR spectrometer.

Table 2 below summarizes examples 27-29

TABLE 2

| No. | Catalyst | Appearance | Precipitate | Residual* | NMR |
|---|---|---|---|---|---|
| 27 | No catalyst | Yellow | No | 79 | Reference |
| 28 | 1-Methylimidazole | Dark red/brown | Yes | 80 | All protons intensity drastically decreased |
| 29 | Piperidine | Dark red/brown | No | 54 | Aromatic protons moved dramatically |

* = @ 550° C.

As is apparent from table 2 above, the use of a catalyst results in the formation of an insoluble precipitate and a change in color, which is indicative of a curing reaction, i.e. chain extension and/or cross-linking. The use of a non-tertiary amine also generates color, but no precipitate was formed.

As further is apparent from table 2 above, the use of a non-tertiary amine results in a much lower residual weight at 550° C., indicating the absence of a polymeric structure.

The reduced intensity observed by H-NMR in Example 28, may be explained by the precipitation of non-soluble polymeric material. Further, the changes in the aromatic proton shifts observed in example 29, may be explained by a reaction between the cross-linker and the nucleophilic non-tertiary amine.

The invention claimed is:

1. A method of chain extending and/or cross-linking an oligomer or a polymer comprising a carbon-carbon triple bond, the method comprising the step of:

heating the oligomer or polymer in the presence of a cyclic aliphatic tertiary amine, a heteroaryl comprising at least one nitrogen atom within the aromatic ring, which nitrogen atom has one electron pair being part of the delocalized aromatic electrons and one electron pair not being part of the delocalized aromatic electrons, or a tertiary nucleophilic organophosphorus compound, wherein said carbon-carbon triple bond is conjugated with a group selected from the group consisting of —C(O)—, —C(O)O—, —C(O)NH—, —C(O)NC1-5 alkyl,

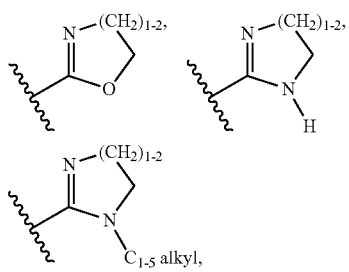

—SO$_2$—, and -Ph.

2. The method according to claim 1, wherein said oligomer or a polymer comprises a phenylethenyl group, a propynoyl group, and/or a group comprising a phenylethenyl group and a propynoyl group.

3. The use method according to claim 1, wherein said cyclic aliphatic tertiary amine or said heteroaryl do not comprise any nitrogen atoms having substitutable hydrogen atoms, and wherein said heteroaryl only comprises carbon, nitrogen, optionally oxygen, and covalently bonded hydrogen atoms and wherein said heteroaryl is unsubstituted or wherein it is substituted with one or more groups, independently selected from the group consisting of —OC1-5 alkyl, —N(C1-5 alkyl)$_2$, and C1-5 alkyl.

4. The method according to claim 1, wherein said catalyst is said heteroaryl and said heteroaryl is mono-cyclic.

5. The method according to claim 4, wherein said heteroaryl is a compound according to any one of the formulas (Xa) to (Xj),

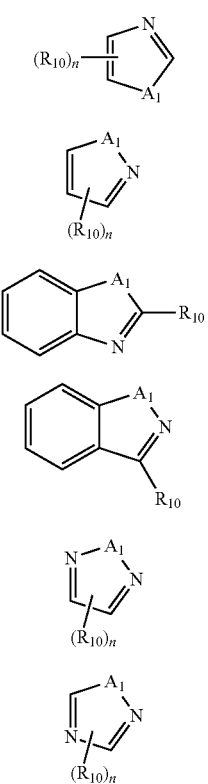

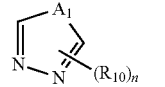

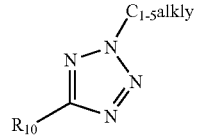

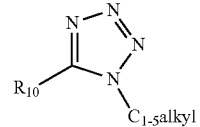

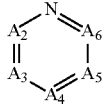

wherein
A1 is NC1-5 alkyl, or "O" (oxygen);
A2 to A6 is independently selected from CH, CR10, and "N" (nitrogen), wherein at least two of A2 to A6 are, independent of each other, CH or CR10;
"n" is an integer of 0 (zero) to 3; and
R10 is selected, independently if more than one R10 is present, from C1-5 alkyl, OC1-5 alkyl, N(C1-5 alkyl)$_2$, and phenyl.

6. The method according to claim 5, wherein A1 is NC1-5 alkyl, and the integer "n" is 0 (zero) or 1.

7. The method according to claim 4, wherein said heteroaryl is 4-dimethylaminopyridine, or 1-methylimidazole.

8. The method according to claim 1, wherein said catalyst is said tertiary nucleophilic organophosphorus compound and said tertiary nucleophilic organophosphorus compound is a compound according to formula (XII)

$$PR_{15}R_{16}R_{17} \tag{XII}$$

wherein R15, R16, and R17 are, independently of each other, selected from the group consisting of C1-5 alkyl, phenyl, OC1-5 alkyl, and Ophenyl.

9. The method according to claim 8, wherein said tertiary nucleophilic organophosphorus compound is selected from the group consisting of triphenylphosphine (PPh$_3$), tributylphosphine (PBu$_3$), trimethylphosphine (PMe$_3$), phenyl dimethylphosphine (PPhMe$_2$), and triphenylphosphite (P(OPh)$_3$).

10. The method according to claim 1, wherein said catalyst is 1,4-diazabicyclo[2.2.2]octane.

11. The method according to claim 1, wherein said oligomer or polymer is heated in the presence of a further compound according to formula (I) or (II),

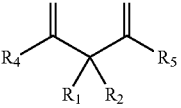

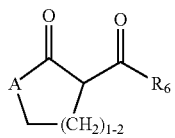
(II)

wherein
R1 and R2, independently of each other, are hydrogen or C1-4 alkyl;
R4 and R5, independently of each other, are C1-5 alkyl or OC1-5 alkyl;
A is O, NC1-5 alkyl, or CH2; and
R6 is C1-5 alkyl or OC1-5 alkyl;
as a co-catalyst.

12. The method according to claim 1, wherein said heating is performed in the presence of at least 5 mole percent of said catalyst with respect to the amount of triple bonds to be chain extended and/or cross-linked.

13. The method according to claim 1, wherein said oligomer or said polymer is an oligo- or polyimide, a polyamide or an epoxy resin.

14. The method according to claim 1, wherein said oligomer or said polymer is obtainable by use of PEPA (phenylethynyl phtalic anhydride), EPA (ethynyl phtalic anhydride), 5,5'-(ethyne-1,2-diyl)bis(isobenzofuran-1,3-dione), 5-(prop-1-yn-1-yl)isobenzofuran-1,3-dione and/or 5-(3-phenylprop-2-ynoyl)isobenzofuran-1,3-dione.

15. The method according to claim 1, wherein said oligomer or said polymer is:
an oligomer or a polymer comprising a residue according to formula (IVa) and/or (IVb),

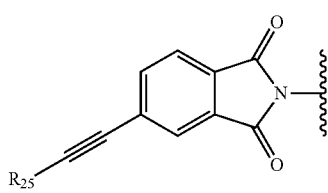
(IVa)

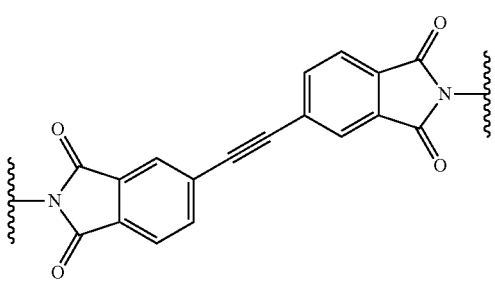
(IVb)

wherein
R25 is hydrogen, C1-5 alkyl, or phenyl, wherein said phenyl optionally is substituted by halogen, C1-5-alkyl, and/or trifluoromethyl; and
the waved line(s) indicate(s) the point of attachment(s) to said oligomer or said polymer;
an oligomer or a polymer comprising a residue according to formula (IVa1), (IVa2), (IVa3), (IVb1), (IVb2) or (IVb3),

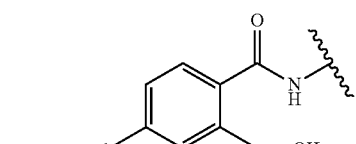
(IVa1)

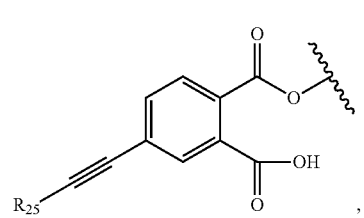
(IVa2)

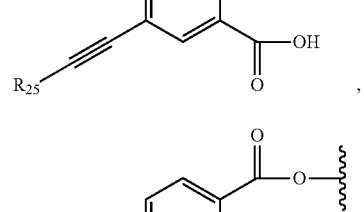
(IVa3)

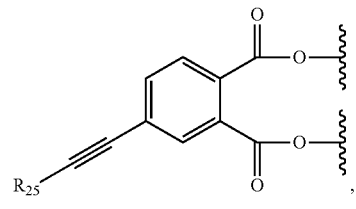
(IVb1)

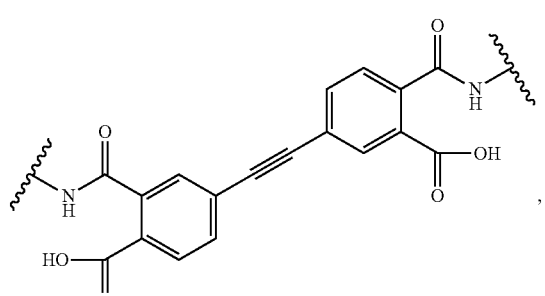
(IVb2)

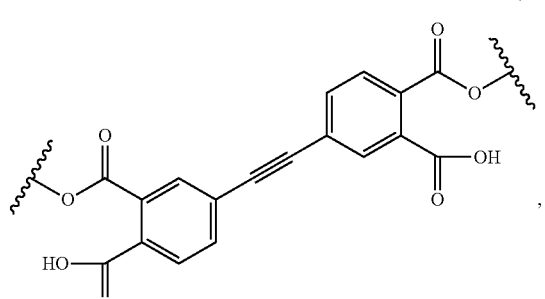
(IVb3)

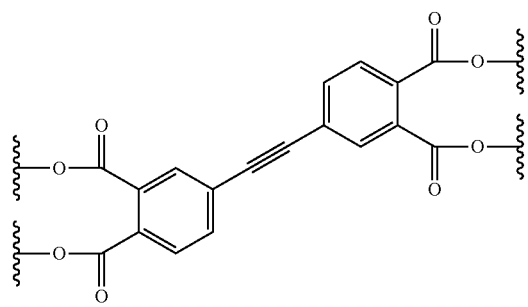

wherein
R25 is hydrogen, C1-5 alkyl, such as methyl, or phenyl, which phenyl optionally is substituted by halogen, C1-5-alkyl, trifluoromethyl; and
the waved line(s) indicate(s) the point of attachment(s) to the oligomer or the polymer;
a residue according to formula (IV),

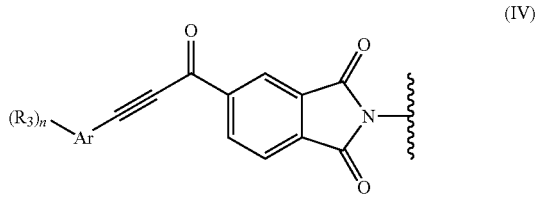

(IV)

wherein
the waved line indicates the point of attachment to the oligomer or the polymer;
"Ar" is an aryl or a heteroaryl;
R3 is, independently if "n" is 2 or more, selected from the group consisting of C1-4 alkyl, OC1-4 alkyl, halogen, cyano, nitro, C1-4 fluoroalkyl;
the substituent(s) R3 may be connected to any substitutable atom(s) of "Ar"; and
"n" is an integer from 0 (zero) to 5; or
an oligomer or a polymer comprising a residue according to formula (IV1), (IV2) or (IV3),

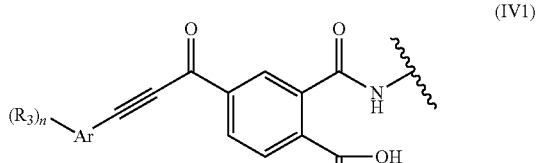

(IV1)

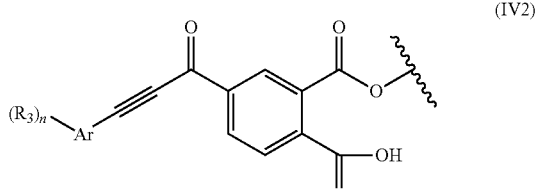

(IV2)

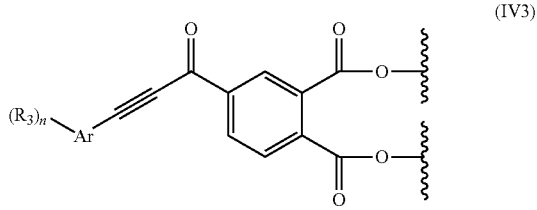

(IV3)

wherein
the waved line indicates the point of attachment to the oligomer or the polymer;
"Ar" is an aryl, such a phenyl, or a heteroaryl;
R3 is, independently if "n" is 2 or more, selected from the group consisting of C1-4 alkyl, OC1-4 alkyl, halogen, cyano, nitro, C1-4 fluoroalkyl;
the substituent(s) R3 may be connected to any substitutable atom(s) of "Ar"; and
"n" is an integer from 0 (zero) to 5.

16. The method according to claim 13, wherein said oligomer or said polymer is an oligo- or polyimide comprising at least one residue of an aromatic dianhydride and at least one residue of an aromatic diamine,
wherein said aromatic diamine is 1,4-diaminobenzene, 1,3-diaminobenzene, or a diamine according to the general formula (XXI)

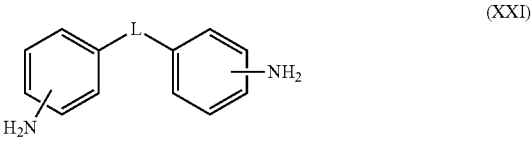

(XXI)

wherein
the amino groups are connected to any substitutable carbon atom in the benzene residues; and
"L" is a direct bond or a moiety selected from the group consisting of —O—, —S—, —C(O)—, —C(CH$_3$)$_2$—, —C(CF$_3$)$_2$—, —CH$_2$—, 3-oxyphenoxy, 4-oxyphenoxy group, 4'-oxy-4-biphenoxy group, and 4-[1-(4-oxyphenyl)-1-methylethyl]phenoxy group; and
wherein said aromatic dianhydride is pyromellitic dianhydride or a dianhydride according to the general formula (XX),

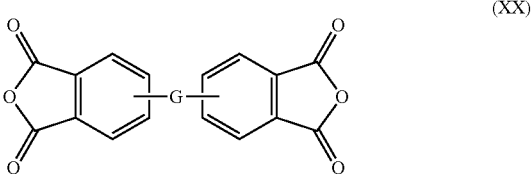

(XX)

wherein
"G" represents a direct bond or a di-valent group selected from the group consisting of a carbonyl group, a methylene group, a sulfone group, a sulfide group, an ether group, an —C(O)-phenylene-C(O)— group, an isopropylidene group, a hexafluoroisopropylidene group, a 3-oxyphenoxy group, a 4-oxyphenoxy group, a 4'-oxy-4-biphenoxy group, and a 4-[1-(4-oxyphenyl)-1-methylethyl]phenoxy group; and
"G" is connected to the 4- or 5-position and the 4"- or 5"-position, respectively, in the isobenzofuran-1,3-dione residues.

17. The method according to claim 16, wherein
said aromatic diamine is selected from the group consisting of pyromellitic dianhydride, 4,4'-oxydiphthalic anhydride, 2,2-bis-[4-(3,4-dicarboxyphenoxy)phenyl]-propane dianhydride, 3,3',4,4'-benzophenonetetracarboxylic acid dianhydride, 3,3',4,4'-tetracarboxybiphenyl dianhydride, 4,4',5,5'-sulfonyldiphthalic anhydride, and 5,5'-(perfluoropropane-2,2-diyl)bis(isobenzofuran-1,3-dione); and
said aromatic diamine selected from the group consisting of 4,4'-oxydianiline, 1,4-diaminobenzene, 1,3-diaminobenzene, 1,3-bis-(4-aminophenoxy)benzene, 1,3-bis-(3-aminophenoxy)benzene, methylenedianiline, and 3,4'-oxydianiline.

18. An intermediate composition for use in the process of claim 1, the composition comprising a cyclic aliphatic tertiary amine, a heteroaryl comprising at least one nitrogen atom within the aromatic ring, which nitrogen atom has one electron pair being part of the delocalized aromatic electrons and one electron pair not being part of the delocalized aromatic electrons, or a tertiary nucleophilic organophosphorus compound optionally a co-catalyst, an oligomer or a polymer comprising a carbon-carbon triple bond, wherein said carbon-carbon triple bond is conjugated with a group selected from the group consisting of —C(O)—, —C(O)O—, —C(O)NH—, —C(O)NC1-5 alkyl,

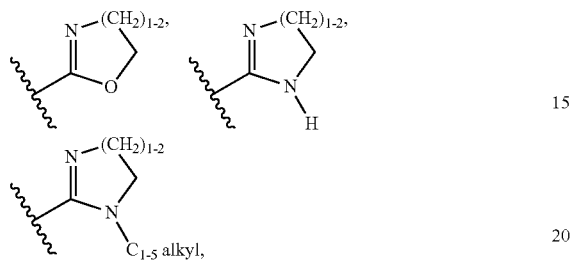

—SO$_2$—, and -Ph and optionally a solvent.

19. The method according to claim 1, wherein said cyclic aliphatic tertiary amine, said nucleophilic heteroaryl or said tertiary nucleophilic organophosphorus compound, any co-catalyst and/or any solvent present, is, at least partly, evaporated during and/or subsequent to the chain extension and/or cross-linking.

* * * * *